United States Patent
Hakkaku et al.

(10) Patent No.: US 10,926,476 B2
(45) Date of Patent: Feb. 23, 2021

(54) SHAPING APPARATUS AND SHAPING METHOD

(71) Applicant: MIMAKI ENGINEERING CO., LTD., Nagano (JP)

(72) Inventors: Kunio Hakkaku, Nagano (JP); Yoshikazu Furukawa, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 403 days.

(21) Appl. No.: 15/997,704

(22) Filed: Jun. 5, 2018

(65) Prior Publication Data

US 2018/0361653 A1    Dec. 20, 2018

(30) Foreign Application Priority Data

Jun. 15, 2017   (JP) ................. 2017-117905

(51) Int. Cl.
| | |
|---|---|
| *B29C 64/40* | (2017.01) |
| *B29C 64/112* | (2017.01) |
| *B29C 64/209* | (2017.01) |
| *B33Y 30/00* | (2015.01) |
| *B33Y 10/00* | (2015.01) |
| *B29C 64/245* | (2017.01) |
| *B29C 64/25* | (2017.01) |

(52) U.S. Cl.
CPC ............ *B29C 64/40* (2017.08); *B29C 64/112* (2017.08); *B29C 64/209* (2017.08); *B29C 64/245* (2017.08); *B29C 64/25* (2017.08); *B33Y 10/00* (2014.12); *B33Y 30/00* (2014.12)

(58) Field of Classification Search
CPC ..... B29C 64/40; B29C 64/106; B29C 64/112; B29C 64/124; B29C 64/129; B29C 64/135
See application file for complete search history.

(56) References Cited

U.S. PATENT DOCUMENTS 5,139,711 A * 8/1992 Nakamura ............. B33Y 10/00
                                                          264/401
5,609,814 A * 3/1997 Takano ................. B29C 64/135
                                                          264/401
(Continued)

FOREIGN PATENT DOCUMENTS

JP          01228827 A  *  9/1989 ........... B29C 64/135
JP          2015071282        4/2015

OTHER PUBLICATIONS

"Search Report of European Counterpart Application," dated Dec. 10, 2018, p. 1-p. 9.

*Primary Examiner* — Atul P. Khare
(74) *Attorney, Agent, or Firm* — JCIPRNET

(57) ABSTRACT

Performing shaping of a shaped object more efficiently. A shaping apparatus configured to shape a shaped object in three-dimensional, includes: ejection heads being object-shaping material heads configured to eject an object-shaping material constituting the shaped object; and an ejection head being a support material head configured to eject a support material being a material of a support layer. The support layer is removable by being immersed in a predetermined liquid, and in a case of forming the support layer, the shaped object is shaped while at least a part of the support layer is immersed in the predetermined liquid in at least a part of a period during the shaping of the shaped object.

10 Claims, 4 Drawing Sheets

(56) References Cited

U.S. PATENT DOCUMENTS

| | | | | |
|---|---|---|---|---|
| 6,838,035 B1* | 1/2005 | Ederer | ............... | B33Y 40/00 |
| | | | | 264/308 |
| 6,932,145 B2* | 8/2005 | Frasier | ............... | B22C 9/04 |
| | | | | 164/122.2 |
| 7,114,943 B1* | 10/2006 | Fong | ............... | B33Y 40/00 |
| | | | | 425/375 |
| 9,556,346 B2* | 1/2017 | Suzuki | ............... | C09D 11/101 |
| 2009/0000678 A1* | 1/2009 | Therriault | ............... | B01F 13/0059 |
| | | | | 137/833 |
| 2016/0214317 A1* | 7/2016 | Kobayashi | ............... | B29C 64/393 |
| 2017/0120535 A1* | 5/2017 | MacCurdy | ............... | B29C 64/40 |
| 2018/0111313 A1* | 4/2018 | Murao | ............... | B29C 64/118 |
| 2018/0222120 A1* | 8/2018 | Hakkaku | ............... | B33Y 50/02 |
| 2018/0273756 A1* | 9/2018 | Saito | ............... | C08L 1/08 |
| 2019/0084220 A1* | 3/2019 | Ochi | ............... | B33Y 10/00 |

\* cited by examiner

Interface (thickness of 10 μm to 200 μm)

50 Shaped object appearance

SHAPING APPARATUS AND SHAPING METHOD

CROSS REFERENCE TO RELATED APPLICATIONS

This application claims the priority benefit of Japanese Patent Application No. 2017-117905, filed on Jun. 15, 2017. The entirety of the above-mentioned patent application is hereby incorporated by reference herein and made a part of this specification.

TECHNICAL FIELD

The present disclosure relates to a shaping apparatus and a shaping method.

DESCRIPTION OF THE BACKGROUND ART

Conventionally, a shaping apparatus (3D printer) that shapes a shaped object using an inkjet head is known (for example, see Japanese Unexamined Patent Publication No. 2015-71282). In such a shaping apparatus, for example, the shaped object is shaped by a laminate shaping method by laminating plural layers of ink layers formed by the inkjet head.

Patent Literature 1: Japanese Unexamined Patent Publication No. 2015-71282

SUMMARY

In a case of shaping a shaped object by a shaping apparatus, depending on a shape of the shaped object, it is necessary to form a support layer around the shaped object during shaping. In this case, the support layer is a structural object that supports at least a part of the shaped object during the shaping, for example. The support layer is formed, for example, based on the shape of the shaped object and as needed, and is removed after completion of the shaping.

However, much burden and time are required in some cases for support layer removal. Further, as a result, there are cases where the shaping of the shaped object is difficult to perform efficiently. More specifically, as a material of the support layer (support material), for example, a material such as a water-soluble material, by which the support layer is removable by immersing it in a predetermined liquid may be considered. Further in this case, in order to suitably remove the support layer, it is normally necessary to immerse the shaped object in the liquid (such as water) for a long period of time after the completion of the shaping. Further, as a result, long time is required before completing all the work. Due to this, it has conventionally been desired to shape the shaped object more efficiently. Thus, the present disclosure aims to provide a shaping apparatus and a shaping method that can solve the above problem.

The inventor of the present application has conducted keen studies on methods for more efficiently performing the shaping of a shaped object. In doing so, the inventor has thought of starting the support layer removal in midst of the shaping instead of starting it after waiting for the completion of the shaping. Further, as a method therefor, the inventor has thought of immersing at least a part of the support layer in the liquid used for the support layer removal in at least a part of the period during the shaping of the shaped object. By configuring as above, for example, the time required for the support layer removal after the completion of the shaping can suitably be shortened. Further, due to this, for example, the shaping of the shaped object can be performed more efficiently.

Further, the inventor of the present application has further conducted keen studies to discover features required to achieve such an effect, and thereby achieved the present disclosure. To solve the above problem, the present disclosure provides a shaping apparatus configured to shape a shaped object in three-dimensional, the shaping apparatus including: an object-shaping material head, configured to eject an object-shaping material being a material that constitute the shaped object; and a support material head, configured to eject a support material being a material of a support layer being a structural object supporting at least a part of the shaped object during a shaping of the shaped object, where the support layer is removable by being immersed in a predetermined liquid, and in a case of forming the support layer, the shaped object is shaped while at least a part of the support layer is immersed in the predetermined liquid in at least a part of a period during the shaping of the shaped object.

In configuring as above, for example, a part of the support layer can be removed during the shaping of the shaped object. Due to this, by configuring as above, for example, time required for support layer removal after completion of the shaping can suitably be shortened. Further, due to this, for example, the shaping of the shaped object can more efficiently be performed.

Here, the support layer being removable by being immersed in the predetermined liquid means, for example, that it dissolves in the predetermined liquid. Further, more specifically, the support layer may, for example, be formed of a material that becomes water-soluble after hardening, and be removable by immersing it in water. In this case, for example, in at least a part of the period during the shaping of the shaped object, at least a part of the support layer may be immersed in water or liquid mainly composed of water.

Further, as the predetermined liquid used for the support layer removal, for example, water to which various additives (such as antiseptics, surfactants, anti-oxidants, or thickeners) are added may be used in accordance with a required performance. Further, in this case, for example, an alkalescent aqueous solution may be used. By configuring as above, for example, the support layer removal can be performed more efficiently within a short time period by using liquid suitable for a nature of the support layer.

In configuring as above, a part of the support layer is removed as above in midst of the shaping. In this regard, the support layer does not necessarily need to maintain its entire shape until the completion of the shaping, but simply needs to keep a portion necessary for shaping operation remaining. Further, more specifically in this case, so long as the support layer remains immediately beneath a position where a new formation takes place with the object-shaping material or at a portion in vicinity thereof, the shaping operation can suitably be performed. Further, in this case, the support layer in a periphery of a portion of a layer of the shaping material constituting the shaped object where sufficient number of layers are formed thereon (for example, a portion that has been formed at an initial stage of the shaping operation) will not be likely to cause any problem even if at least some portion thereof is removed. Due to this, even in configuring as above, the shaped object can suitably be formed while a portion in need of support in the shaped object during the shaping is suitably supported by the support layer.

Further, during the shaping of the shaped object, a case where the time required for the support layer removal becomes problematic is when dissolving the support layer in the liquid takes time equal to or longer than a certain time period. Further, in such a case, even if the support layer is immersed in the liquid during the shaping, the support layer does not completely dissolve in an instant. Due to this, in this regard as well, the shaped object can suitably be formed while the portion in need of support in the shaped object during the shaping is suitably supported by the support layer. Further, in order to more suitably manage a support layer removing amount during the shaping, preferably, the time to immerse the support layer in the liquid is suitably adjusted. Further, in this case, for example, a time period from when respective portions of the support layer are formed until immersing it in the liquid is preferably changeable (adjustable).

Further, in regard to how the support layer is immersed in the liquid, specifically, for example, a liquid reservoir that stores the liquid for dissolving the support layer may be used, and a method may be used in which the shaping stage mounting the shaped object on its upper surface during the shaping is moved in a depth direction of the liquid in the liquid reservoir. In this case, the liquid reservoir is, for example, a container that stores the predetermined liquid used for the support layer removal, and is arranged at a position facing the object-shaping material head and the support material head with the shaping stage in between the liquid reservoir and the heads. Further, in this case, a laminating direction actuator configured to move the shaping stage in a laminating direction, which is a direction along which the object-shaping material is laminated during the shaping of the shaped object, the shaping stage being moved relatively to the object-shaping material head and the support material head, may be used to relatively move the shaping stage in the laminating direction while immersing at least a part of the support layer in the liquid in the liquid reservoir in at least a part of the period during the shaping of the shaped object. Further, in this case, the liquid depth direction in the liquid reservoir becomes a direction parallel to the laminating direction, for example. Further, the laminating direction actuator moves the shaping stage relatively in the laminating direction so that the shaping stage moves to a deeper position in the liquid reservoir in accordance with progress of the shaping of the shaped object, for example. By configuring as above, for example, the shaping operation can suitably be performed while immersing the support layer in the liquid.

Further, as to how the support layer is to be immersed in the liquid, the liquid may be stored on the shaping stage without using the liquid reservoir as above. In this case, for example, a wall that surrounds a certain region may be formed on the shaping stage using at least one of the object-shaping material and the support material, and the liquid may be stored in the region surrounded by the wall. Further, more specifically in this case, for example, a wall that surrounds a periphery of the support layer with a clearance from the support layer may be formed on the shaping stage during the shaping of the shaped object. In this case, the predetermined liquid is stored between the support layer and the wall, by which at least a part of the support layer is immersed in the predetermined liquid in at least a part of the period during the shaping of the shaped object. In configuring as above, for example, the shaping operation can suitably be performed while immersing the support layer in the liquid.

Further, in this case, for example, the liquid stored between the support layer and the wall may be ejected from a flowable material head. The flowable material head is an ejection head that ejects a flowable material, which is a material that maintains flowability during the shaping of the shaped object, for example. Further, in this case, the flowable material head ejects the predetermined liquid used for the support layer removal, for example, as the flowable material. The predetermined liquid is stored between the support layer and the wall by ejecting the predetermined liquid from the liquid ejection head.

Further, in order to more efficiently perform the support layer removal, the support layer may be given other configurations instead of forming it only by the support material. In this case, for example, the support layer may be formed by further using the flowable material in addition to the support material. More specifically in this case, a part of the support layer may be formed of the support material, and at least another part of the support layer may be formed of the flowable material. In configuring as above, in the support layer, the support material exists in a hardened state. Further, the flowable material maintains its flowability in the support layer. In this case, by removing the support material portion in the support layer by dissolving or the like, the flowable material inside the support layer also flows out. Due to this, by configuring as above, for example, the support layer removal can be performed more efficiently within a short time period.

Further, in this case, as for a relationship between the support material and the flowable material, for example, the relationship is preferably set so that the support material in the hardened state dissolves in the flowable material. By configuring as above, for example, by dissolving the support material from an inside of the support layer as well, the support layer removal can be performed more efficiently within a short time period. Further, as such a flowable material, same or similar liquid as the predetermined liquid used for the support layer removal may be used. More specifically, for example, in the case of using a water-soluble support material, the support layer may be formed by using the support material and water.

Further, in forming the support layer, the object-shaping material may be used, for example, as the material other than the support material. In this case, for example, by forming a part of the support layer by use of the object-shaping material, strength of the support layer can suitably be increased. Further, more specifically in this case, for example, a structure that supports the support material on a periphery in the inside of the support layer may be formed of the object-shaping material. Further, as the structure that supports the support material on the periphery, for example, a pillar-like or plate-like structure may be formed. By configuring as above, for example, even in the case where a part of the support layer is removed during the shaping, an entirety of the support layer can suitably be prevented from collapsing. Further, due to this, for example, a function of the support layer can more suitably be maintained.

Further, in the case of removing the support layer by immersing it in the liquid, the support layer can more efficiently be removed by applying ultrasound, for example. Due to this, in this configuration as well, for example, an ultrasound generator configured to generate the ultrasound may further be used. In this case, for example, in at least a part of the period during the shaping of the shaped object, at least a part of the support layer is immersed in the predetermined liquid to which the ultrasound generated from the ultrasound generator is applied. By configuring as above, for example, the support layer removal can be performed more efficiently within a short time period.

Further, as a configuration of the present disclosure, a shaping method having similar features as above may be used. In this case as well, for example, similar effects as above can be achieved. Further, this shaping method may, for example, be considered as a shaped object production method.

According to the present disclosure, the shaping of the shaped object can be performed more efficiently.

BRIEF DESCRIPTION OF THE DRAWINGS

FIG. 1A illustrates an example of a configuration of a primary portion of the shaping apparatus 10. FIG. 1B illustrates an example of a configuration of a head 12 of the shaping apparatus 10.

FIG. 2A illustrates an example of a configuration of the head 12 used in this variant example. FIG. 2B illustrates an example of the configuration of the support layer 52. FIG. 2C illustrates another variant example of the configuration of the support layer 52.

FIG. 3A illustrates another variant example of the configuration of the support layer 52. FIG. 3B illustrates another variant example of the configuration of the support layer 52.

FIGS. 4A and 4B illustrate the variant example of the configuration of the shaped object 50 to be shaped by the shaping apparatus 10. FIG. 4C illustrates a variant example of the configuration of the shaping apparatus 10.

DETAILED DESCRIPTION OF EMBODIMENTS

Figure 1A:
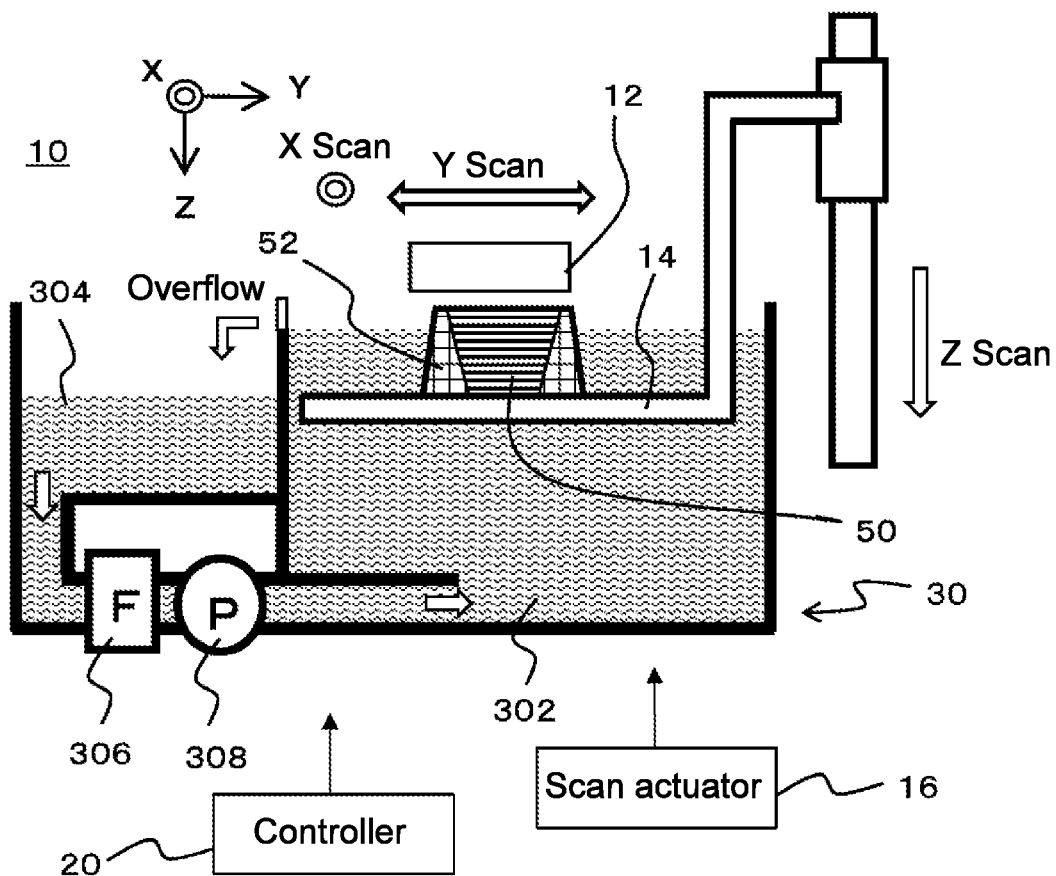
FIGS. 1A and 1B are diagrams illustrating an example of a shaping apparatus 10 according to an embodiment of the present disclosure.
Figure 1B:
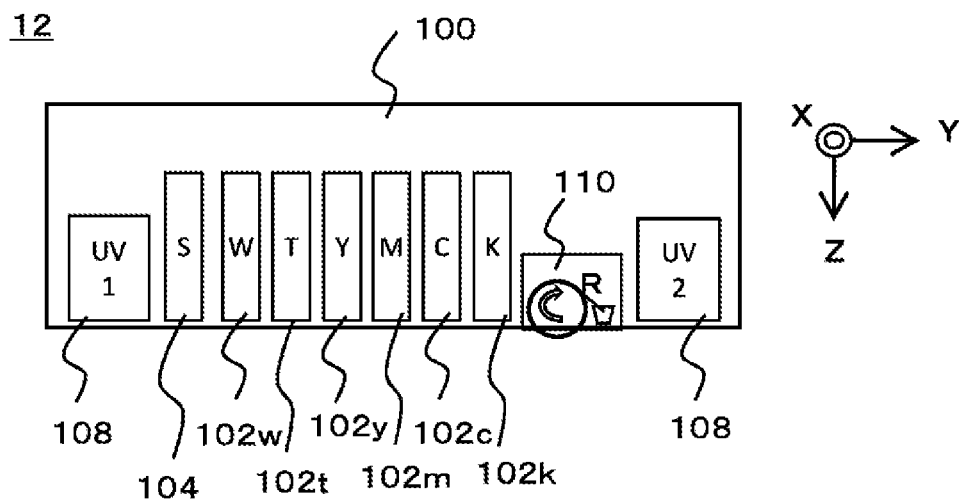

Hereinbelow, embodiments according to the present disclosure will be described with reference to the drawings. FIGS. 1A and 1B illustrate an example of a shaping apparatus 10 according to an embodiment of the present disclosure. FIG. 1A illustrates an example of a configuration of a primary portion of the shaping apparatus 10. FIG. 1B illustrates an example of a configuration of a head 12 of the shaping apparatus 10.

Note that otherwise described hereinbelow, the shaping apparatus 10 may have same or similar features as a conventional shaping apparatus. More specifically, aside from points described hereinbelow, the shaping apparatus 10 may have same or similar features as a known shaping apparatus that performs shaping by ejecting droplets that are to be a material of a shaped object 50 using ejection heads such as inkjet heads, for example. Further, the shaping apparatus 10 may further be provided with respective configurations necessary for shaping the shaped object 50, for example, aside from illustrated configurations.

In this example, the shaping apparatus 10 is a shaping apparatus (3D printer) that shapes the three-dimensional shaped object 50 by a laminate shaping method. In this case, the laminate shaping method is, for example, a method of shaping the shaped object 50 by laminating a plurality of layers. The shaped object 50 is, for example, a three-dimensional structural object with height, depth, and width dimensions. Further, in this example, the shaping apparatus 10 includes a head 12, a shaping stage 14, a scan actuator 16, a controller 20, and a liquid reservoir 30. The head 12 is a head unit that ejects an object-shaping material and the like that is a material constituting the shaped object 50. Further, in this example, ink is used as the object-shaping material. In this case, the ink is, for example, a functional liquid. Further, in this example, the ink may be said as being a liquid ejected from an inkjet head. In this case, the inkjet head is, for example, an ejection head that ejects droplets of the ink in an inkjet scheme. Further, more specifically, the head 12 ejects ink that hardens under a predetermined condition from a plurality of inkjet heads as the object-shaping material. Then, respective layers constituting the shaped object 50 are formed by lamination by hardening the ink after landing. Further, in this example, ultraviolet curing ink (UV ink) that hardens by ultraviolet irradiation is used as the ink.

Further, the head 12 further ejects a material of a support layer 52 in addition to the object-shaping material. Further, due to this, the head 12 forms the support layer 52 around the shaped object 50 as needed. The support layer 52 is a laminate structural object (support portion) that supports (support) the shaped object 50 by surrounding an outer periphery and the like of the shaped object 50 during shaping, for example. Further, the support layer 52, for example, may be regarded as a structural object that supports at least a part of the shaped object 50 during the shaping of the shaped object 50. Further, as for the support layer 52, for example, it may be regarded as a configuration that supports the object-shaping material so that it does not collapse at an overhanging portion of the shaped object 50. The support layer 52 is formed as needed in the shaping of the shaped object 50, and is removed after completion of the shaping.

Further, in this example, the support layer 52 is configured to be removable by immersing it in a predetermined liquid. In this case, being removable by immersing it in the predetermined liquid means, for example, that it dissolves in the predetermined liquid. Further, the support layer 52 dissolving means, for example, that the material constituting the support layer 52 (support material) dissolves. Further, more specifically in this example, the shaping apparatus 10 forms the support layer 52 using a water-soluble support material. In this case, the water-soluble support material is, for example, a material that exhibits water-soluble nature in a state where the support layer 52 has been formed (in a hardened state).

The shaping stage 14 is a stage member that supports the shaped object 50 during the shaping, is arranged at a position facing the inkjet heads in the head 12, and mounts the shaped object 50 on its upper surface during the shaping. Further, in this example, the shaping stage 14 has a configuration by which at least the upper surface is movable in a laminating direction (Z direction in the drawings), and at least the upper surface is moved in accordance with progress of the shaping of the shaped object 50 by being driven by the scan actuator 16. In this case, the laminating direction is, for example, a direction along which the object-shaping material is laminated in the laminate shaping method. Further, more specifically in this example, the laminating direction is a direction that intersects perpendicularly to a main scanning direction (Y direction in the drawings) and a sub scanning direction (X direction in the drawings).

The scan actuator 16 is an actuator that causes the head 12 to perform scan operations of moving relatively to the shaped object 50 during the shaping. In this case, moving relatively to the shaped object 50 during the shaping means moving relatively to the shaping stage 14, for example. Further, causing the head 12 to perform the scan operations means causing the inkjet heads and the like included in the head 12 to perform the scan operations, for example. Further, in this example, the scan actuator 16 causes the head 12 to perform a main scanning operation (Y scan), a sub scanning operation (X scan), and a laminating direction scan (Z scan). Further, due to this, the scan actuator 16 serves as a main scan actuator, a sub scan actuator, and a laminating direction actuator.

In this case, the main scanning operation is, for example, an operation to eject the ink while moving in the main scanning direction relatively to the shaped object 50 during the shaping. In this example, the scan actuator 16 causes the head 12 to perform the main scanning operation by fixing a position of the shaping stage 14 in the main scanning direction and moving the head 12. Further, the scan actuator 16 may, for example, move the shaped object 50 while fixing a position of the head 12 in the main scanning direction and moving the shaping stage 14, for example.

The sub scanning operation is, for example, an operation to move in the sub scanning direction, which intersects perpendicularly to the main scanning direction, relatively to the shaped object 50 during the shaping. Further, more specifically, the sub scanning operation is, for example, an operation to move relatively to the shaping stage 14 in the sub scanning direction by a preset feed amount. In this example, the scan actuator 16 causes the head 12 to perform the sub scanning operation by fixing the position of the head 12 in the sub scanning direction and moving the shaping stage 14 in between main scanning operations. Further, the scan actuator 16 may cause the head 12 to perform the sub scanning operation by fixing the position of the shaping stage 14 in the sub scanning direction and moving the head 12.

The laminating direction scan is, for example, an operation to move the head 12 in the laminating direction relatively to the shaped object 50 during the shaping. Further, the scan actuator 16 adjusts a relative position of the inkjet heads with respect to the shaped object 50 during the shaping in the laminating direction by causing the head 12 to perform the laminating direction scan in accordance with the progress of the shaping operation. Further, more specifically, in the laminating direction scan in this example, the scan actuator 16 fixes the position of the head 12 in the laminating direction and moves the shaping stage 14. The scan actuator 16 may move the head 12 while fixing the position of the shaping stage 14 in the laminating direction.

The controller 20 is, for example, a CPU of the shaping apparatus 10, and controls the shaping operations in the shaping apparatus 10 by controlling respective modules of the shaping apparatus 10. More specifically, the controller 20 controls the respective modules of the shaping apparatus 10 based on shape information, color information, and the like of the shaped object 50 to be shaped, for example.

The liquid reservoir 30 is a container that stores the liquid for dissolving the support layer 52. In this case, the liquid for dissolving the support layer 52 is, for example, the liquid that dissolves the support material constituting the support layer 52. Further, as above, in this example, the support layer 52 is formed using the water-soluble support material. Due to this, water is used as the liquid stored in the liquid reservoir 30. Further, the liquid reservoir 30 is arranged at the position facing the head 12 with the shaping stage 14 in between them, for example. Further, the shaping apparatus 10 performs the shaping of the shaped object 50 while immersing the shaped object 50 and at least a part of the support layer 52 in the liquid (water) in the liquid reservoir 30 in at least a partial period of at least during the shaping.

Further, more specifically, in this example, the liquid reservoir 30 includes a first liquid chamber 302, a second liquid chamber 304, a filter 306, and a pump 308. The first liquid chamber 302 is a liquid chamber for immersing the shaped object 50 and the support layer 52 in the liquid during the shaping. The first liquid chamber 302 is a liquid chamber with a size capable of accommodating the shaping stage 14 therein, and a liquid surface thereof is maintained at all times at a position lower than a lower surface of the head 12 and lower than a lamination plane during the shaping by overflowing. Further, in this example, the shaping apparatus 10 immerses the support layer 52 in the liquid in the first liquid chamber 302 by moving the shaping stage 14, which has the shaped object 50 and the support layer 52 during the shaping mounted on the upper surface thereof, into the liquid reservoir 30.

In configuring as above, in midst of the shaping, at least a part of the support layer 52 makes contact with the liquid in the first liquid chamber 302. Further, as a result, the dissolution of the support layer 52 progresses to some degree in the midst of the shaping. Due to this, according to this example, a part of the support layer 52 can be removed, for example, during the shaping of the shaped object 50. Further, due to this, for example, the time required for removing the support layer 52 after the completion of the shaping is shortened, and the shaping of the shaped object 50 can be performed more efficiently.

Further, as described above, in the laminating direction scan performed during the shaping operation, the scan actuator 16 moves the shaping stage 14 in the laminating direction. Then, in this case, the scan actuator 16 moves the shaping stage 14 to a deeper position in the first liquid chamber 302 in the liquid reservoir 30 as illustrated, for example, in the drawings in accordance with the progress of the shaping of the shaped object 50. Further, due to this, in at least a partial period during the shaping of the shaped object 50, the scan actuator 16 moves the shaping stage 14 in the laminating direction relatively to the head 12 while immersing a part of the support layer 52 in the liquid in the first liquid chamber 302. Further, this configuration may be considered, for example, as a configuration that performs the shaping of the shaped object 50 on the container that stores the liquid, and gradually sinks the shaped object 50 together with the support layer 52 in the liquid in accordance with the progress of the shaping.

Further, the second liquid chamber 304 is a liquid chamber that stores the liquid overflown from the first liquid chamber 302 by overflow in the first liquid chamber 302. A position of a liquid surface of the second liquid chamber 304 is adjusted to be lower than the position of the liquid surface of the first liquid chamber 302 as illustrated, for example, in the drawings. Further, in this example, the first liquid chamber 302 and the second liquid chamber 304 are connected via the filter 306 and the pump 308 as illustrated in the drawings. The filter 306 is a filter that filtrates the liquid flowing from the second liquid chamber 304 to the first liquid chamber 302. The pump 308 is a pump that causes the liquid to flow from the second liquid chamber 304 toward the first liquid chamber 302, and at least feeds the liquid to the first liquid chamber 302 during the shaping. By configuring as above, while filtering the liquid by the filter 306, the liquid can be circulated suitably between the first liquid chamber 302 and the second liquid chamber 304. Further, by feeding the liquid using the pump 308 from the second liquid chamber 304 to the first liquid chamber 302 and causing the liquid overflown from the first liquid chamber 302 to flow to the second liquid chamber 304, the position of the liquid surface of the first liquid chamber 302 can suitably be adjusted. In this case, by circulating the liquid as above, the liquid can be reused. Further, in a case where a performance of the liquid to dissolve the support layer 52 deteriorates due to a long-term use, for example, the liquid is preferably discharged from a liquid discharging port that is not shown to replace it with a new liquid.

Further, in this case, the position of the liquid surface of the first liquid chamber 302 is associated with a timing when the support layer 52 starts to be immersed in the liquid. More specifically in this example, a position of the lamination plane (lamination upper surface) is above the position of the liquid surface of the first liquid chamber 302. In this case, the position of the lamination plane is a position in a layer being formed (position along the laminating direction) in a lamination operation to laminate an ink layer. Further, in this case, the timing when the support layer 52 starts to be immersed in the liquid is determined according to a distance between the lamination plane and the liquid surface of the first liquid chamber 302 (distance in the laminating direction). Further, in this case, the support layer 52 is immersed in the liquid at an earlier timing when a difference between the positions of the above is smaller, and the dissolution of the support layer 52 progresses faster.

Due to this, in this case, for example, the timing when the support layer 52 starts to be immersed in the liquid can be adjusted by adjusting a positional relationship between the lamination plane and the liquid surface of the first liquid chamber 302. More specifically, in this example, the adjustment of the timing when the support layer 52 starts to be immersed in the liquid is performed by allowing the positional relationship between the lamination plane and the liquid surface of the first liquid chamber 302 to be adjustable, and adjusting this positional relationship. Further, in this case, the adjustment may be made so that the support layer 52 and the shaped object 50 are immersed in the liquid after the shaping of the shaped object 50 progresses to some extent and a height of the shaped object 50 during the shaping exceeds a predetermined height. By configuring as above, the time to immerse the support layer 52 in the liquid can suitably be adjusted. Further, in this case, the height position of the liquid surface of the first liquid chamber 302 as above can be set by adjusting a height of an outlet of the overflow.

Here, as can be understood from the operations and the like explained above, in this example, the dissolution of the support material in the liquid reservoir 30 progresses in order from a lower side in the laminating direction, which is a portion that is formed earlier in the shaping operation. Further, in this case, a periphery of a region where a new ink layer is formed of the object-shaping material is supported by the support layer 52 in a state where the dissolution of the support material has not yet progressed. Due to this, in configuring as above as well, the shaped object in the shaping can be suitably supported by the support layer 52. Further, in this case, the shaping stage 14 may be lowered sufficiently, for example, after the completion of the shaping to immerse entireties of the shaped object 50 and the support layer 52 in the liquid in the first liquid chamber 302, and they may be left as such. By configuring as above, for example, post-processing to dissolve the support layer 52 after the shaping can suitably be performed.

Further, as above, in this example, a part of the support layer 52 is removed in midst of the shaping. In regard to this point, the support layer 52 does not necessarily need to maintain its entire shape until the completion of the shaping, and it may simply be in a state where a portion needed for the shaping operation remains. Further, more specifically in this case, so long as the support layer 52 remains immediately beneath the position where the new formation with the object-shaping material takes place or in a vicinity thereof, the shaping operation may be suitably performed. Further, in this case, as of the support layer 52 in a periphery of a portion within the layers of the shaping material, which is a portion on which a sufficient number of layers are formed such as a portion formed at an initial stage of the shaping operation, for example, it would not cause a problem even if some degree of portions thereof is removed. Due to this, in this example as well, while the portion of the shaped object 50 that needs support during the shaping is suitably supported by the support layer 52, and the shaped object 50 can suitably be shaped.

Further, in the shaping of the shaped object 50, the time required for the removal of the support layer 52 becomes problematic when dissolving the support layer 52 in the liquid takes time equal to or longer than a certain time period. Further, in such a case, even if the support layer 52 is immersed in the liquid during the shaping, the support layer 52 does not dissolve away in an instant. Further, in this example, as described, for example, in the above, the time to immerse the support layer 52 in the liquid is suitably adjusted to more suitably manage a removal amount of the support layer 52 during the shaping.

Further, as described above, in this example, the support layer 52 that is removable by immersing it in water is formed. Further, the liquid reservoir 30 stores water. In this case, for example, tap water can suitably be used. Further, as the liquid to be stored in the liquid reservoir 30, water to which various additives (such as antiseptics, surfactants, anti-oxidants, or thickeners) are added may be used in accordance with a required performance. Further, in this case, an aqueous solution that has turned water to be alkalescent by adding the additives may be used. In this case, alkalescent refers to a state in which pH is, for example, equal to or greater than 8 but equal to or less than 10 (preferably equal to or less than 9). By configuring as above, for example, the support layer 52 can more suitably be dissolved. Further, as the liquid to be stored in the liquid reservoir 30, liquids other than water may be used, for example, in accordance with a nature of the support material. Further, in this case, for example, various types of liquids with water as the main component may be used. The water being the main component means, for example, containing equal to or greater than 50% water in weight ratio. In configuring as above as well, same or similar effects as the case of using water can suitably be achieved. Further, in the case of using a support material other than the water-soluble support material, non-aqueous liquids may be used in accordance with the nature of the support material.

Next, a more specific configuration of the head 12 will be described. In this example, the head 12 includes a carriage 100, a plurality of ejection heads, a plurality of ultraviolet light sources 108, and a flattening roller 110. The carriage 100 is a retaining member that retains respective configurations of the head 12. Further, in this example, the head 12 includes an ejection head 102w, an ejection head 102t, an ejection head 102y, an ejection head 102m, an ejection head 102c, an ejection head 102k, and an ejection head 104 as the plurality of ejection heads, as illustrated in FIG. 1B. These plurality of ejection heads are arranged, for example, along the main scanning direction while having their positions in the sub scanning direction set to be same.

Further, among these ejection heads, the ejection head 102w, the ejection head 102t, the ejection head 102y, the ejection head 102*m*, the ejection head 102*c*, and the ejection head 102*k* (hereinbelow referred to as ejection heads 102*w* to *k*) are inkjet heads that eject the object-shaping materials, and they eject ink of colors different from each other as the object-shaping materials. Further, more specifically, the ejection head 102*w* ejects white (W) ink. The ejection head 102*t* ejects clear ink. In this case, the clear ink is, for example, ink with a clear color, which is a colorless transparent color (T). Further, in this example, the ejection head 102*y*, the ejection head 102*m*, the ejection head 102*c*, and the ejection head 102*k* are inkjet heads that eject colored ink for the shaped object 50. Further, the ejection head 102*y* ejects yellow (Y) ink. The ejection head 102*m* ejects magenta (M) ink. The ejection head 102*c* ejects cyan (C) ink. Further, the ejection head 102*k* ejects black (K) ink.

Further, in this example, the ejection heads 102*w* to *k* are examples of an object-shaping material head. Each of the ejection heads 102*w* to *k* includes, for example, a nozzle row in which a plurality of nozzles are arranged along a predetermined nozzle row direction on a surface facing the shaping stage 14. The nozzle row direction is, for example, a direction parallel to the sub scanning direction. Further, the ejection heads 102*w* to *k* each eject the ink to respective portions of the shaped object 50 in accordance with the control of the controller 20, in accordance with the structure and colors of the shaped object 50 to be shaped. Further, due to this, the shaping apparatus 10 shapes a shaped object 50 of which surface is colored, for example.

Further, among the ejection heads provided in the head 12, the ejection head 104 is an example of a support material head, and ejects ink used as the support material. In this case, the support material is, for example, a material that hardens according to a predetermined condition, and is used for forming the support layer 52. As the support material, for example, a well-known material for the support layer may suitably be used. Further, more specifically in this example, the ultraviolet curing ink is used as the support material as well. In this case, for example, it is preferable to use the ultraviolet curing ink that cures at a weaker degree compared to the ultraviolet curing ink used as the object-shaping material. By configuring as above, for example, the removal of the support layer 52 can more easily and suitably be performed.

Further, as described above, the material having the nature to dissolve in the predetermined liquid is used as the support material. In this case, the support material dissolving in the predetermined liquid means, for example, that the support material in a hardened state dissolves in the predetermined liquid. Further, more specifically in this example, the water-soluble support material that dissolves in water is used as the support material. As such a support material, for example, a well-known water-soluble support material and the like may suitably be used. Further, as the ejection head 104, for example, an inkjet head same as or similar to the ejection heads 102*w* to *k* may suitably be used.

The plurality of ultraviolet light sources 108 are light sources for curing the ink (UV light source), and generate ultraviolet light for curing the ultraviolet curing ink. Further, in this example, each of the plurality of ultraviolet light sources 108 is arranged at a one end side and the other end side of the head 12 in the main scanning direction with the rows of the ejection heads interposed therebetween. As the ultraviolet light sources 108, for example, UV LEDs (ultraviolet LEDs) and the like may suitably be used. Further, as the ultraviolet light sources 108, metal halide lamps and mercury lamps may be used. The flattening roller 110 is flattening means for flattening the ink layers formed during the shaping of the shaped object 50. The flattening roller 110 contacts a surface of the ink layer, for example, during the main scanning operation to remove a part of uncured ink and to flatten the ink layer.

By using the head 12 having the above configuration, the ink layers constituting the shaped object 50 can suitably be formed. Further, by forming the plurality of ink layers by laminating them, the shaped object 50 can suitably be shaped. Further, as needed, the support layer 52 can suitably be formed in the periphery of the shaped object 50.

The specific configuration of the head 12 is not limited to the configuration described above, and may be altered in various ways. For example, the head 12 may further include an inkjet head that ejects ink of a color other than the aforementioned as the object-shaping material head. In this case, for example, an inkjet head that ejects ink dedicated to shaping to be used for shaping an inside (inner region) of the shaped object 50 may be used. Further, various alterations may be made as to how the plurality of inkjet heads are arranged in the head 12. For example, a part of the inkjet heads may be displaced in the sub scanning direction relatively to other inkjet heads.

Next, variant examples of the configuration of the shaping apparatus 10 and the shaping operation will be described. In the above, the operation for the case of only immersing the support layer 52 in the liquid (for example, water) has been primarily described in connection to the operation to dissolve the support layer 52 in the liquid reservoir 30. In regard to this point, in the case of removing the support layer 52 by immersing it in the liquid, for example, ultrasound may be applied to more efficiently remove the support layer 52. Due to this, in a variant example of the configuration of the shaping apparatus 10, for example, the liquid in the first liquid chamber 302 may be vibrated by ultrasound to perform the removal of the support layer 52 more efficiently. In this case, the liquid reservoir 30 may further include an ultrasound generator. Further, in at least a partial period during the shaping of the shaped object 50, at least a part of the support layer 52 is immersed in the liquid to which the ultrasound generated by the ultrasound generator is applied. By configuring as above, for example, the removal of the support layer 52 can be performed more efficiently. Further, in this case, by further controlling a timing to generate the ultrasound, for example, the removal of the support layer 52 can be made efficient while suppressing an influence on shaping accuracy. More specifically, in this case, the ultrasound may be generated by avoiding a timing to eject the ink in the main scanning operation.

Further, in the above, the liquid reservoir 30 has been described as a part of the configuration of the shaping apparatus 10. However, in a variant example of the configuration of the shaping apparatus 10, the liquid reservoir 30 may be regarded as a separate configuration from the shaping apparatus 10. In this case, for example, the shaped object 50 may be considered to be shaped in a shaping system including the shaping apparatus 10 and the liquid reservoir 30.

Further, to perform the removal of the support layer 52 more efficiently, the configuration of the support layer 52 may be configured further dissolvable to the predetermined liquid (for example, water). More specifically, as described above, in this example, a part of the support layer 52 is dissolved before the completion of the shaping by performing the shaping of the shaped object 50 while immersing the support layer 52 in the liquid that dissolves the support material. Further, due to this, the time required for removing the support layer 52 after the completion of the shaping is shortened, and the shaping of the shaped object 50 is enabled to be performed more efficiently. Further, in this case, in order to more efficiently perform the removal of the support layer 52, for example, the support layer 52 may be formed not only of the support material, and the support layer 52 may be formed by further using a flowable material in addition to the support material. In this case, the flowable material is, for example, a material that maintains its flowability during the shaping of the shaped object 50. Further, the flowable material may, for example, be considered as a material that maintains its liquid state without hardening by the condition that hardens the support material (for example, by ultraviolet irradiation). For example, in the configuration of the support layer 52 described below, a liquid is used as the flowable material. In this case, for example, the liquid with the property to dissolve the support material may suitably be used. Further, as such a liquid, for example, a same liquid as the liquid stored in the liquid reservoir 30 may be used. Further, more specifically, in the case of using the water-soluble support material, water may be used as the flowable material. In this case, the support material and water may be used to form the support layer 52. Further, in this case, the head 12 that further includes an ejection head that ejects the flowable material is preferably used as the head 12.

Figure 2A:
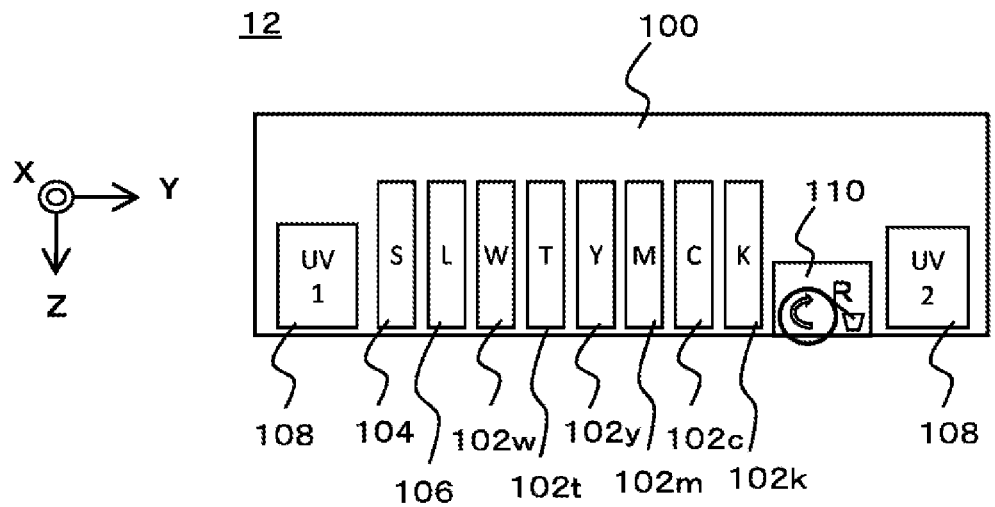
FIGS. 2A to 2C are diagrams that further explain a variant example of a configuration of a support layer 52 in detail.
Figure 2B:
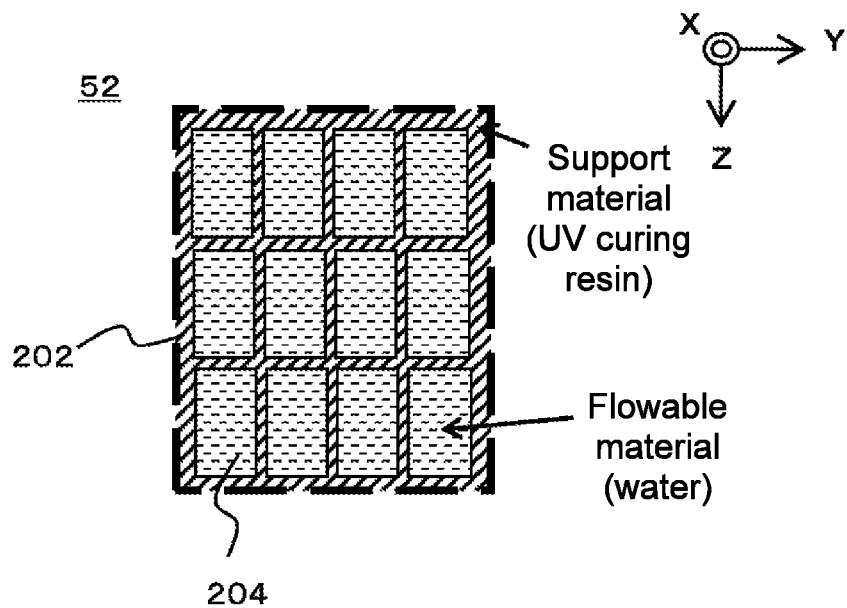
Figure 2C:
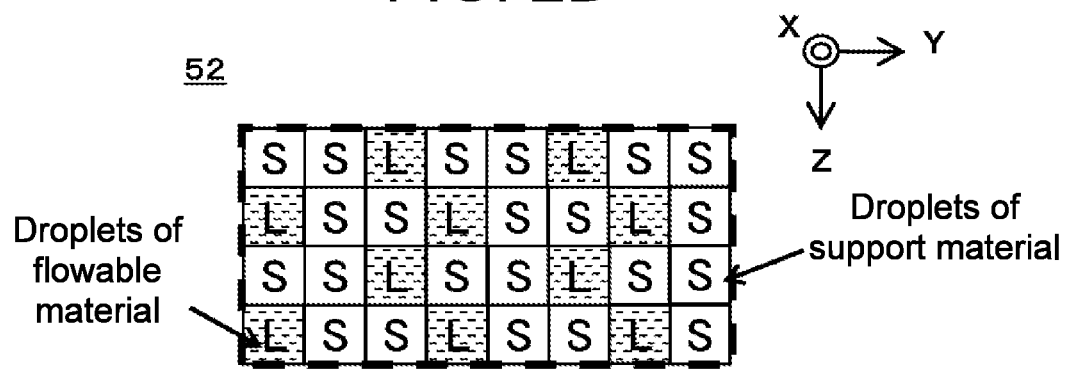

FIGS. 2A to 2C are diagrams that explain a variant of the configuration of the support layer 52 in further detail. Aside from the points described hereinbelow, configurations in FIGS. 2A to 2C given the same reference signs as FIGS. 1A and 1B may have features same as or similar to those of the configuration of FIGS. 1A and 1B.

FIG. 2A illustrates an example of the configuration of the head 12 used in this variant example. This head 12 may, for example, be used in the shaping apparatus 10 illustrated in FIG. 1A instead of the head 12 illustrated in FIG. 1B. Further, in this variant example, the head 12 further includes an ejection head 106 in addition to the configuration illustrated in FIG. 1B. The ejection head 106 is an example of the flowable material head, and ejects the flowable material. As the ejection head 106, for example, an inkjet head that is same as or similar to the ejection heads 102w to k may suitably be used. Further, as the flowable material, for example, water is used.

Further, in this case, the support layer 52 is formed not only of the support material ejected from the ejection head 104, but is formed by further using the flowable material ejected from the ejection head 106. Forming the support layer 52 by further using the flowable material means, for example, forming a part of the support layer 52 using the support material in the case of forming the support layer 52 in the shaping of the shaped object, and forming at least another part of the support layer 52 using the flowable material. In this case, in the support layer 52, the support material exists in the hardened state. Further, the flowable material maintains its flowability in the support layer 52.

In FIGS. 1B and 2A, the configuration for a case of retaining the plurality of ejection heads of the head 12 on one carriage 100 is illustrated. However, in another variant example of the configuration of the shaping apparatus 10, the plurality of ejection heads of the head 12 may be divided and retained on a plurality of carriages 100. Further, in this case, for the plurality of carriage 100, they may be configured capable of moving independently of each other. For example, as will be described later in further detail, the flowable material may be filled by the ejection head 106 in a cavity in a region formed of the support material upon forming the support layer 52. Moreover in this case, a timing to eject the flowable material may in some cases be preferable to be set independently of an ejection timing of the support material. Due to this, in such a case, for example, the ejection head 106 that ejects the flowable material may be retained on a different carriage 100 from the carriage 100 retaining other inkjet heads. By configuring as above, the timing to eject the flowable material from the ejection head 106 can more flexibly be set.

Further, for at least a part of the plurality of inkjet heads that the head 12 includes, for example, an ejection head that ejects droplets by a scheme other than the inkjet scheme may be used instead. For example, as the ejection head 106 for ejecting the flowable material, an ejection head that ejects the flowable material by a scheme other than the inkjet scheme may be used. Further, in this case, as the ejection head 106, for example, an ejection head with a greater ejectable liquid amount (ejection performance) per unit time than the ejection heads 102w to k and the ejection head 104 is preferably used. More specifically, as an ejection head 106 as such, a well-known dispenser and the like may suitably be used, for example. By configuring as above, for example, the ejection of the flowable material from the ejection head 106 can be performed more efficiently. Further, in a case of using the ejection head 106 with such a large ejection performance, the ejection head 106 is especially preferably retained on the different carriage 100 from that of the other ejection heads (ejection heads 102w to k and ejection head 104).

Next, characteristics of the support layer 52 formed in this variant example will be described in further detail. FIG. 2B is a diagram illustrating an example of the configuration of the support layer 52, and illustrates an example of a configuration of a cross section of a part of the support layer 52 along a plane that intersects perpendicularly to the sub scanning direction. In this variant example, the shaping apparatus 10 forms a support material region 202 having a structure including cavities 204 therein as a part of the support layer 52. In this case, the support material region 202 is a region formed of the support material ejected from the ejection head 104. Further, the cavities 204 in the support material region 202 are regions where the support material is not filled in the support layer 52, for example. Further, in this variant example, water which is the flowable material ejected from the ejection head 106 is filled in the cavities 204 in the support material region 202. Further, due to this, the support layer 52 is formed by using the support material and the flowable material.

In configuring as above, the support layer 52 comes to contain water which is the liquid that dissolves the support material therein. Moreover in this case, during the shaping of the shaped object, the support material gradually dissolves from inside (inner side) of the support layer 52 during the shaping. Due to this, by configuring as above, for example, the support layer 52 can be dissolved to some degree from the inner side of the support layer 52 as well during the shaping of the shaped object. Further, due to this, for example, work to remove the support layer 52 that is performed in a post-process after the shaping can be made easier, and the time required to remove the support layer 52 can more suitably be shortened. Further, in this case, by forming the support layer 52 using the flowable material in addition to the support material, for example, while suppressing a usage amount of the support material, the support layer 52 can be suitably formed. Further, in this case, by forming a part of the support layer 52 using water, which is a material that is significantly cheaper than the support material, shaping cost can significantly be reduced.

Further, as described above, the support layer 52 is removed after the completion of the shaping of the shaped object. In this case, the support material constituting the support layer 52 needs to be processed as waste (industrial waste), for example. Due to this, in a case where the usage amount of the support material is large in the support layer 52, burden and cost for processing the waste become high. In contrast to this, in this variant example, the waste generated by the shaping can also be reduced by reducing the usage amount of the support material. Further, in this variant example, by including the flowable material in the support layer 52, the removal of the support material can more surely be performed, for example. Due to this, for example, the support material can more suitably be prevented from remaining on the surface of the shaped object after the completion of the shaping. Further, due to this, how the colors of the shaped object are seen can be prevented form changing (for example, whitening) due to the support material remaining on the surface of the shaped object. Due to this, according to this variant example, various problems generated in the case of forming the support layer 52 can more suitably be suppressed. Further, due to this, for example, the support layer 52 can more suitably be formed.

Here, for the structure of the support layer 52 in this variant example, as can be seen in the configuration, for example, illustrated in the drawings, it can be considered as a configuration in which a region of the support material (ink) and a region of the flowable material (water) are separated and divided into sections. Further, in this case, a shape and a size of the sections of the flowable material are not limited to the illustrated configuration, and may be modified in various ways. Further, in this case, a capacity ratio of the region where the flowable material is filled is preferably increased within a range by which the supporting function of the support layer 52 can be maintained. By configuring as above, for example, the removal of the support layer 52 can be performed easier. Further, the shaping cost can more suitably be reduced. Further, in this configuration, each of the sections in which the flowable material is filled (cavities 204 of the support material region 202) may be communicated with each other. In this case, sections communicating means, for example, that the flowable material can move through a plurality of sections. By configuring as above, the flowable material can be filled easier and more suitably in the plurality of sections. Further, in this case, the support material region 202 is preferably formed so that the flowable material does not flow out to outside the support layer 52.

Further, in the case of forming the support layer 52 with the configuration of this variant example, in the shaping of the shaped object, in the operation to form the respective ink layers to be laminated, for example, the support material region 202 including the cavities 204 is formed of the support material ejected from the ejection head 104. Then, the flowable material is filled in the cavities 204 by the ejection head 106 at any timing before closing upper surfaces of the cavities 204 by the support material. Further, in this case, a portion that closes the upper surfaces of the cavities 204 in the support material region 202 is formed by further ejecting the droplets of the support material from the ejection head 104 on the flowable material filled in the cavities 204. By configuring as above, for example, the support material region 202 having the cavities 204 can be suitably formed.

Further, as described above, in this variant example, water is used as the flowable material. By configuring as above, for example, in the case of ejecting the droplets of the support material over the flowable material, the support material can suitably be hardened before the support material sinks in the flowable material. Further, due to this, the portion for closing the upper surfaces of the cavities 204 in the support material region 202 can suitably be formed by the aforementioned operation.

As described above, the liquid with the nature of dissolving the support material is preferable used as the flowable material, such as water. However, in considering from the viewpoint of simplifying the removal of the support layer 52, not being limited to the case of using the flowable material with the nature of dissolving the support material, the removal of the support layer 52 becomes easier even in a case of using a flowable material with a nature that does not dissolve the support material as compared to the case of forming the support layer 52 only by the support material. Further, in the case of forming the support layer 52 using the flowable material in addition to the support material, as described above, various other effects such as the shaping cost reduction can further be achieved.

Due to this, as the flowable material, for example, the material with the nature that does not dissolve the support material may be used. Further, in a case of using a flowable material other than water, for example, a material that does not harden under the condition which hardens the support material may be used as the flowable material. Further, as the flowable material, it is preferable to use a material cheaper than the support material. In this case, for example, a material that does not contain substances for hardening the material (for example, ultraviolet curing resin) may be used.

Further, for a relationship between the flowable material and the support material, they are preferably in the relationship by which the support material ejected on the flowable material can be suitably hardened. Due to this, for example, in the case of ejecting the droplets of the support material over the flowable material, the support material needs to be able to stay afloat on the flowable material and be able to maintain its quality within the time period necessary for hardening the support material. Further, more specifically, as the flowable material, for example, (a) a substance with a specific weight that is close to or heavier than that of the support material or (b) a substance with high viscosity, which takes long time for the support material to sink therein may be used. As the material qualifying as (a), for example, paraffin-based solvent may be used, for example. Further, a fluorine-based inert liquid such as hydro fluoro ether and fluorocarbons may be used. Further, as the material qualifying as (b), for example, glycerin, or a liquid mixture of glycerin and water may be used.

Further, in connection to a sinking speed of the support material, the specific weight of the ink (ink droplets) may be greater than water. Further, for example, saturated hydrocarbons (such as paraffin-based and naphthene-based), mineral oil, or silicon oil and the like may be used depending on a physical property of the ink used as the support material. Further, as the flowable material, a material that does not chemically attack (react with) the support material and the object-shaping material is preferably used. Further, antiseptics, surfactants, anti-oxidants, or thickeners may be added to the flowable material as needed.

Further, the configuration of the support layer 52 is not limited to the configuration illustrated in FIG. 2B, and may be altered in various ways. For example, the support layer 52 may not distinctively form the support material region 202, but may mix the support material and the flowable material at droplet levels.

FIG. 2C is a diagram illustrating another variant example of the configuration of the support layer 52, and illustrates an example of the configuration of the cross section of a part of the support layer 52 along the plane that intersects perpendicularly to the sub scanning direction. In this case, the ejection heads 104 and 106 are caused to eject the support material and the flowable material so that the support material and the flowable material exist in a mixed manner with a ratio in a preset range in at least a part of the support layer 52. Further, due to this, for example, as illustrated in the drawing, the support layer 52 is formed so that the support material and the flowable material exist therein in the mixed manner in droplet (drops) units. In configuring as above as well, for example, the support material 52 can suitably be formed using the support material and the flowable material.

In this case, the ratio of the support material and the flowable material constituting the support layer 52 is set in the range by which the supporting function of the support layer 52 can suitably be maintained. More specifically in this case, a volume ratio of the support material is set to a value equal to or greater than a lower limit value by which the supporting function of the support layer 52 can be maintained. Further, in FIG. 2C, the configuration of the support layer 52 (voxel configuration) is schematically shown for an example of a case where the volume ratio of the support material and the flowable material is at about 2:1.

Further, as above, in the case of arranging the support material and the flowable material to exist in the mixed manner, there is a risk that it becomes difficult to suitably keep the shape of the support layer 52 when the flowable material in the support layer 52 flows out. Due to this, in this case, the support layer 52 is particularly preferably formed so that the flowable material does not flow out to outside the support layer 52. Further, more specifically in this case, an outer peripheral portion of the support layer 52 may be formed only by the support material without mixing the flowable material therein. In this case, the outer peripheral portion of the support layer 52 refers, for example, to an outer peripheral portion of the support layer in a plane that intersects perpendicularly to the laminating direction along which the object-shaping material is laminated. Further, the outer peripheral portion of the support layer 52 may be regarded as a portion that is in contact with open air in the support layer 52, for example. By configuring as above, for example, even in the case of arranging the support material and the flowable material to exist in the mixed manner in the support layer 52 in the droplet units, the flowable material can suitably be retained inside the support layer 52.

Further, in configuring as above as well, the usage amount of the support material is reduced to suitably reduce the shaping cost. Further, as compared to the case of forming the support layer 52 only by the support material, the removal of the support layer 52 can be made easier. Further, in this case, similarly to the case of using water as the flowable material and using the water-soluble support material, for example, a combination in the relationship under which the support material dissolves in the flowable material can be used to gradually dissolve the support layer 52 from the inside of the support layer 52 during the shaping of the shaped object. Due to this, in configuring as above as well, the work to remove the support layer 52 that is performed in the post-process after the shaping can be made easier, and the time required to remove the support layer 52 can suitably be shortened.

Figure 3A:
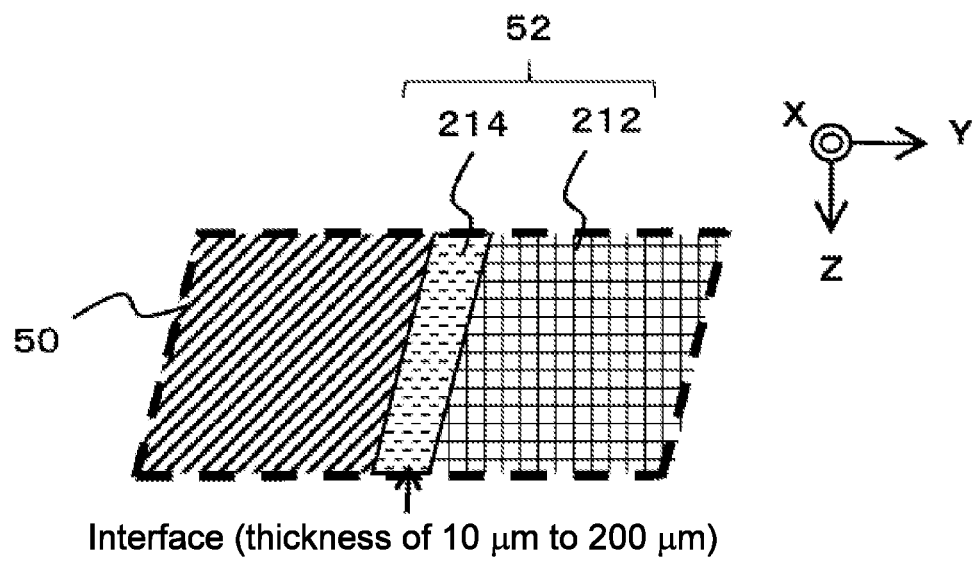
FIGS. 3A and 3B are diagrams that explain another variant example of the configuration of the support layer 52.
Figure 3B:
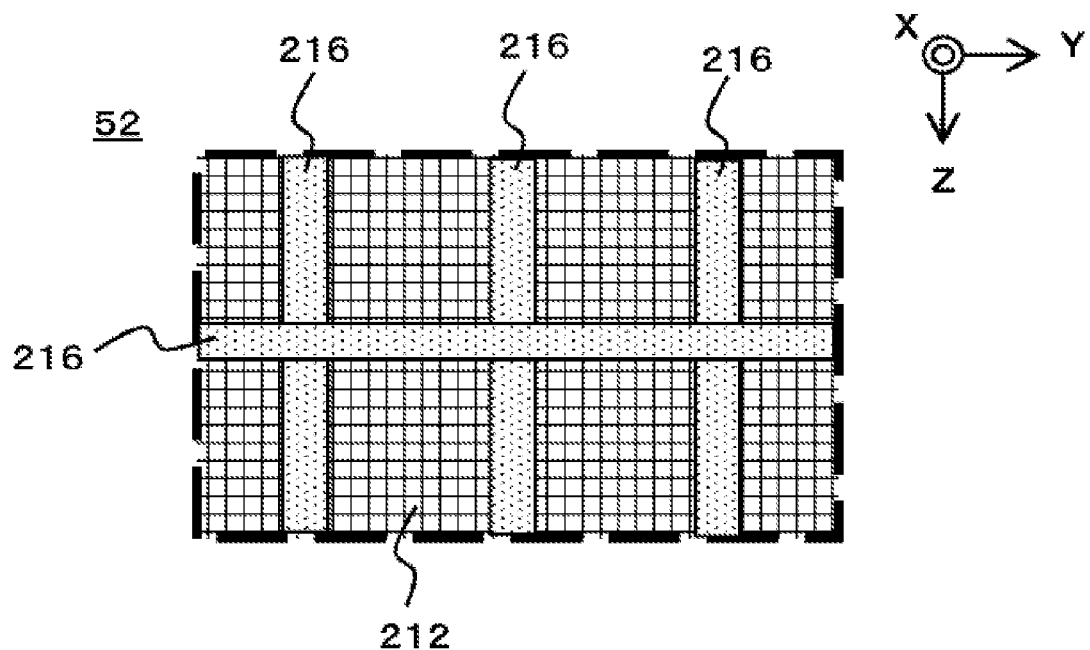

Further, other variant examples may be considered for the configuration of the support layer 52. FIGS. 3A and 3B are diagrams describing other variant examples of the configuration of the support layer 52. Note that otherwise described hereinbelow, the configurations in FIGS. 3A and 3B given same reference signs as FIGS. 1A to 2C may have same or similar features as the configuration of FIGS. 1A to 2C.

FIG. 3A is a diagram illustrating another variant example of the configuration of the support layer 52, and illustrates an example of the configuration of the cross section of a vicinity of a portion of the support layer 52 that makes contact with the shaped object 50 along the plane that intersects perpendicularly to the sub scanning direction. In this variant example, by forming a part of the support layer 52 only by the flowable material, the removal of the support layer 52 can be made easier. Further, more specifically in this case, the shaping apparatus 10 forms the support layer 52 having a primary support portion 212 and a boundary portion 214 as illustrated in the drawing. In this case, the primary support portion 212 is a portion in the support layer 52 that is other than the boundary portion 214 being the portion in contact with the shaped object 50. In this variant example, the primary support portion 212 is formed, for example, by using the support material and the flowable material same as or similarly to the case illustrated in FIGS. 2A to 2C. Further, in a yet another variant example of the configuration of the support layer 52, the primary support portion 212 may be formed only by the support material without using the flowable material.

Further, the boundary portion 214 is a region in the support layer 52 at the boundary in contact with the shaped object 50. The boundary portion 214 may, for example, be formed in a region along the surface of the shaped object 50 at a predetermined range of thickness (for example, within about 10 to 200 μm). Further, in this variant example, the boundary portion 214 is formed only of the flowable material without using the support material. By configuring as above, for example, the support material in the support layer 52 is suitably prevented from firmly adhering to the shaped object 50. Further, due to this, for example, the removal of the support layer 52 can be made easier. Further, in this case, since the support material can more suitably be prevented from remaining while being adhered to the shaped object 50, for example, the occurrence of changes in how the colors of the shaped object 50 are seen due to the support material remaining on the surface of the shaped object 50 can more surely be prevented.

Further, in a case of forming the boundary portion 214 as in this variant example, for example, an entirety of the portion of the support layer 52 in contact with the shaped object 50 is more preferably formed only of the flowable material. By configuring as above, for example, the removal of the support layer 52 can be made easier. Further, depending on the shape of the shaped object 50, only a part of the portion in contact with the shaped object 50 may be formed only of the flowable material.

Further, in another variant example of the configuration of the support layer 52, the support layer 52 may be formed of a material other than the support material and the flowable material. FIG. 3B is a diagram illustrating another variant example of the configuration of the support layer 52, and illustrates an example of the configuration of the cross section of a part of the support layer 52 along the plane that intersects perpendicularly to the sub scanning direction.

As described above, to efficiently perform the removal of the support layer 52, the support layer 52 may be immersed in the liquid that dissolves the support material in the midst of the shaping. However, in this case, for example, if the dissolution of the support layer 52 progresses excessively, the strength of the support layer 52 might become insufficient. Further, in the case of forming the support layer 52 by using the support material and the flowable material instead of forming it only by the support material, for example, the strength of the support layer 52 might become weak as compared to the case of forming the support layer 52 only by the support material. Further, like the case of using water as the flowable material and using the water-soluble support material, for example, using the combination in the relationship under which the support material dissolves in the flowable material, the strength of the portion in the support layer 52 where the dissolution progressed might become insufficient, depending on the shape of the shaped object 50.

Contrary to this, in a case where the strength of the support layer 52 needs to be further increased, a configuration for retaining the shape of the support layer 52 may be formed inside the support layer 52. Further, as such a configuration, for example, a part of the support layer 52 may be formed of the object-shaping material used in the shaping of the shaped object 50 instead of the support material and the flowable material. More specifically, in a case of a configuration illustrated in FIG. 3B, the support layer 52 includes a primary support portion 212 and a non-dissolvable portion 216. In this case, the primary support portion 212 is a portion of the support layer 52 other than the non-dissolvable portion 216. The primary support portion 212 is formed, for example, using the support material and the flowable material same as or similarly to the cases illustrated in FIGS. 2B and 3A. Further, as for the primary support portion 212, for example, it may be formed only of the support material without using the flowable material.

Further, the non-dissolvable portion 216 is a portion formed of the material that does not dissolve by the flowable material. Further, more specifically, in this variant example, the non-dissolvable portion 216 is formed of the object-shaping material. In this case, the object-shaping material is, for example, the ink ejected from the ejection heads 102w to k (see FIG. 1B) in the head 12. Further, in this case, the non-dissolvable portion 216 is formed, for example, as a pillar-like or plate-like structure within the support layer 52 to function as a structure that supports the support material at its periphery. By configuring as above, for example, a stable support layer 52 can more suitably be formed. Further, in this case, for example, even if a part of the support layer 52 is removed during the shaping, the entirety of the support layer 52 is suitably prevented from collapsing. Further, due to this, for example, the function of the support layer 52 can more suitably be maintained.

Figure 4A:
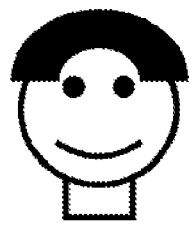
FIGS. 4A to 4C are diagrams explaining a variant example of the configurations of a shaped object 50 and the shaping apparatus 10.
Figure 4B:
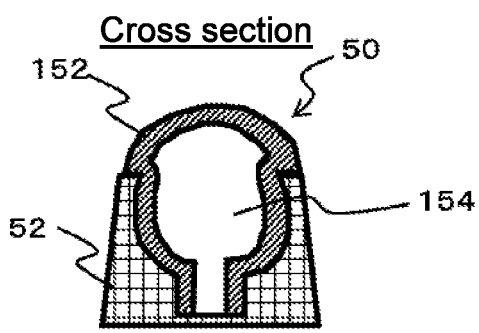
Figure 4C:
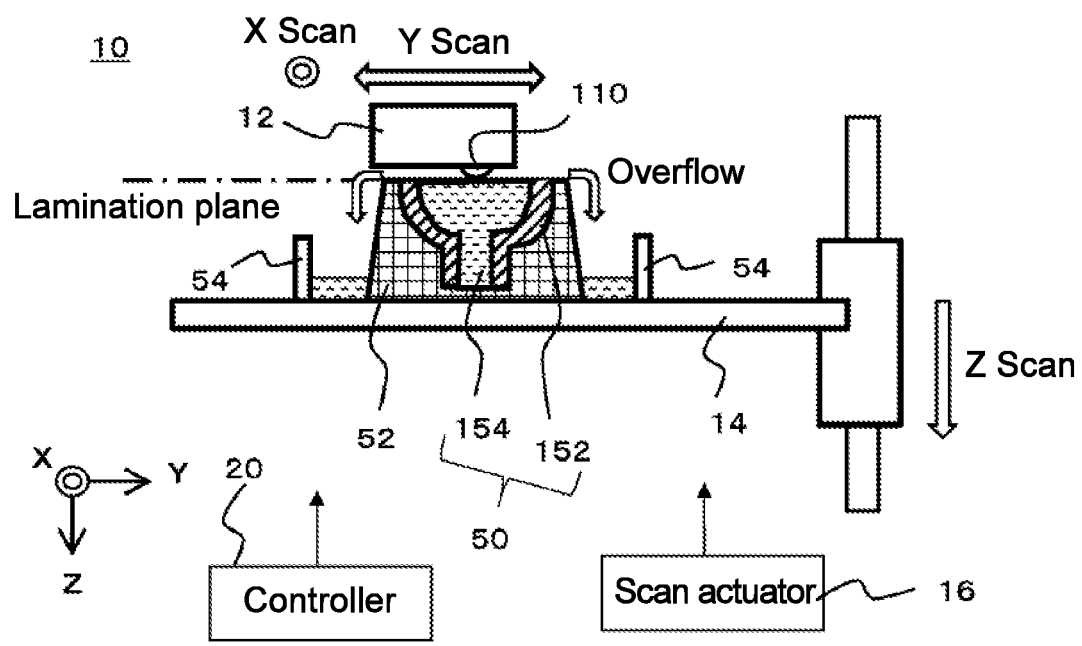

Next, variant examples of the configurations of the shaped object 50 and the shaping apparatus 10 will be described. FIGS. 4A to 4C are diagrams that explain variant examples of the configurations of the shaped object 50 and the shaping apparatus 10. Note that otherwise described hereinbelow, the configurations in FIGS. 4A to 4C given same reference signs as FIGS. 1A to 3B may have features same as or similar to those of the configuration of FIGS. 1A to 3B.

FIGS. 4A and 4B illustrate a variant example of the configuration of the shaped object 50 shaped by the shaping apparatus 10. FIG. 4A illustrates an example of an outer appearance of a completed shaped object 50 (shaped object appearance). FIG. 4B illustrates a cross section of the shaped object 50 together with a cross section of the support layer 52. In the above, reducing the usage amount of the support material and reducing the shaping cost, for example, by using the support material and the flowable material in the support layer 52 has been described. However, in the case of using the flowable material, the usage amount of the object-shaping material used in the shaping of the shaped object 50 can similarly be reduced.

More specifically, in this variant example, as illustrated in FIG. 4B, the shaped object 50 is formed with a structure including a shaping material region 152 and a cavity 154. In this case, the shaping material region 152 is a region formed of the object-shaping material, and is formed in an outer peripheral region of the shaped object 50 so as to surround the cavity 154 inside the shaped object 50. Further, the cavity 154 is a region inside the shaped object 50 where the object-shaping material is not filled. By configuring as above, for example, the usage amount of the object-shaping material used upon shaping the shaped object 50 can suitably be reduced. Further, due to this, the shaping cost of the shaped object 50 can suitably be reduced.

Further, in this case, the cavity 154 in the shaped object 50 is formed, for example, by using the flowable material ejected from the ejection head 106 in the head 12. More specifically in this case, upon the shaping of the shaped object 50, the shaping object 50 including the shaping material region 152 and the cavity 154 is shaped by forming the shaping material region 152 on the periphery in a state where the flowable material is filled in the region where the cavity 154 is to be formed. Further, in this case, the flowable material filled in the cavity 154 may be taken out from the inside of the shaped object 50 before the completion of the shaping. In this case, for example, a hole may be formed at a part of the surface of the shaped object 50, and the flowable material may be taken out through the hole. Further, depending on a purpose and required quality of the shaped object 50, the shaping of the shaped object 50 may be completed in the state where the flowable material is still filled in the cavity 154.

Further, in the above, the operation to immerse the support layer 52 in the liquid (water, etc.) during the shaping was primarily described by using the liquid reservoir 30 (see FIG. 1A). However, in a variant example of the configuration of the shaping apparatus 10, the support layer 52 may be immersed in the liquid without using the liquid reservoir 30. Further, in this case, more specifically, the flowable material ejected from the ejection head 106 in the head 12 (see FIG. 2A) may be stored on the shaping stage 14, and the support layer 52 may be immersed therein.

FIG. 4C is a diagram illustrating a variant example of the configuration of the shaping apparatus 10, and illustrates an example of the configuration of the shaping apparatus 10 during the shaping operation in the case of shaping the shaped object 50 with the configuration as described in FIGS. 4A and 4B. Further, more specifically, in this shaping operation, as described above with reference to FIGS. 3B and 3C, the shaped object 50 having the shaping material region 152 and the cavity 154 is shaped. Further, during shaping, as illustrated in the drawings, for example, the shaping material region 152 and the support layer 52 are formed in the state where the flowable material is filled in the cavity 154.

Further, in this case, the flowable material in the cavity 154 may, for example, be regarded as a support portion inside the shaped object 50. More specifically, in this case, by ejecting the ink to be used as the object-shaping material over the flowable material in the cavity 154, the shaping material region 152 with various types of shapes can be shaped. Further, due to this, for example, for a portion of the shaping material region 152 that closes an upper side of the cavity 154 can suitably be formed as well without ejecting the support material into the cavity 154. Due to this, by configuring as above, for example, the shaped object 50 having the cavity 154 therein can more suitably be shaped.

Further, in this case, in parallel to the operation for laminating the ink layers constituting the shaped object 50, the flowable material is ejected from the ejection head 106 into the cavity 154 while maintaining a position in the lamination plane. Further, due to this, the flowable material is thereby filled in the cavity 154. In this case, the position in the lamination plane refers to a position in a layer being formed in the laminating operation for laminating the ink layer (position in the laminating direction). Further, ejecting the flowable material while maintaining the position in the lamination plane means ejecting the flowable material in the operation for shaping the shaped object 50 without separately performing a lamination direction scan (Z scan) for filling the flowable material. Further, more specifically in this case, the ejection of the flowable material may be performed in the main scanning operation that ejects the object-shaping material and the support material.

Further, in this case, for example, the flowable material may be ejected at an amount that is greater than a minimum required amount so that the flowable material in the cavity 154 will not be in deficit. In this case, the excessive flowable material that exceeds the lamination plane during the laminating operation flows out from the upper surface of the shaped object 50 during the shaping, either by overflowing from a layer surface, being removed together with a part of uncured ink by adhering to the flattening roller 110 in the flattening operation by the flattening roller 110 of the head 12, or overflowing from the cavity 154 by being pushed out by the flattening roller 110.

In contrast to this, in this variant example, as illustrated in the drawing, for example, a wall 54 for retaining the overflown flowable material on the shaping stage 14 is formed. In this case, for example, at the beginning of the operation to shape the shaped object 50, the wall 54 that surrounds the periphery of the shaped object 50 is formed on the shaping stage 14 in parallel to the shaping of the shaped object 50. Further, in this case, the wall 54 is formed on the shaping stage 14 so as to surround the peripheries of the shaped object 50 and the support layer 52 in a state where a clearance is formed between the shaped object 50 and the support layer 52 so that the flowable material can be stored between the shaped object 50 and the support layer 52.

By configuring as above, for example, an influence on the periphery can suitably be suppressed even in the case where the flowable material flows out from the cavity 154. Further, in this case, the flowable material that has flown out from the cavity 154 does not spread on the shaping stage 14, but is instead stored in a region surrounded by the wall 54. Due to this, after when the shaping of the shaped object 50 is completed, for example, only the flowable material in the range surrounded by the wall 54 simply needs to be removed by suction using a syringe before or after taking the shaped object 50 and the support layer 52 off of the shaping stage 14. Further, in this case, when the wall 54 is torn down, the wall 54 can easily and suitably be removed from the shaping stage 14 as well. Due to this, by configuring as above, the shaping operation performed using the flowable material can more suitably be performed.

Here, a height of the wall 54 (height in the laminating direction) simply needs to be at a height by which the overflown flowable material does not leak out from the wall 54. Due to this, the height of the wall 54 may be lower than the shaped object 50 as illustrated in the drawing, for example. Further, the wall 54 may be formed by using at least one of the support material and the object-shaping material. Further, in this case, the ink ejected from any of the ejection heads 102w to k may be used as the object-shaping material. Further, the wall 54 may be formed by using both the support material and the object-shaping material. Further, a part of the wall 54 may be formed of the flowable material similarly to the various configurations of the support layer 52 described above.

Further, in this case, since the flowable material is stored between the wall 54 and the support layer 52, at least a part of the support layer 52 is immersed in the flowable material at the outer surface side of the support layer 52. Due to this, for example, similarly to the case of using water as the flowable material and using the water-soluble support material, by using the combination in the relationship under which the support material dissolves in the flowable material, the support layer 52 dissolves to some extent from the outer side as well in the midst of the shaping operation. Due to this, in configuring as above as well, at least a part of the support layer 52 can suitably be immersed in the liquid that dissolves the support material during at least a partial period during the shaping. Further, due to this, for example, the support layer 52 is dissolved parallel to the shaping, and the time required for the support layer removal after the completion of the shaping can suitably be shortened.

As described above, in this variant example, the liquid for dissolving the support layer is stored between the support layer 52 and the wall 54 by ejecting the flowable material from the ejection head 106 used for forming the shaping material region 152 and the support layer 52. Further, in a variant example of the configuration of the shaping apparatus 10, the liquid may be stored in the region surrounded by the wall 54 using a configuration different from the ejection head 106. In this case, for example, another ejection head that ejects the liquid may further be used. Further, in this case, as the liquid stored in the region surrounded by the wall 54, a liquid different from the flowable material ejected by the ejection head 106 may be used. In this case as well, by using the liquid that dissolves the support material, for example, the time required for the support layer removal after the completion of the shaping can suitably be shortened.

INDUSTRIAL APPLICABILITY

The present disclosure can suitably be used, for example, in a shaping apparatus.

What is claimed is:

1. A shaping apparatus configured to shape a shaped three-dimensional object, the shaping apparatus comprising:
an object-shaping material head, configured to eject an object-shaping material as a material that constitutes the shaped object;
a support material head, configured to eject a support material as a material of a support layer being a structural object supporting at least a part of the shaped object during a shaping of the shaped object; and
a controller configured to gradually sink the shaped object together with the support layer in a predetermined liquid during the shaping of the object,
wherein the support layer is removable by being immersed in the predetermined liquid, and
wherein the shaping apparatus is configured such that when forming the support layer, the shaped object is shaped while at least a part of the support layer is immersed in the predetermined liquid in at least a part of a period during the shaping of the shaped object.

2. The shaping apparatus according to claim 1, further comprising:
a shaping stage, on an upper surface of which the shaped object is mounted during the shaping;
a liquid reservoir as a container for storing the predetermined liquid, the liquid reservoir being arranged at a position facing the object-shaping material head and the support material head with the shaping stage in between; and
a laminating direction actuator, configured to move the shaping stage in a laminating direction, which is a direction along which the object-shaping material is laminated during the shaping of the shaped object, the shaping stage being moved relative to the object-shaping material head and the support material head,
wherein, in at least the part of the period during the shaping of the shaped object, the laminating direction actuator moves the shaping stage in the laminating direction relative to the object-shaping material head and the support material head while immersing at least the part of the support layer in the liquid in the liquid reservoir.

3. The shaping apparatus according to claim 2, wherein the laminating direction actuator moves the shaping stage in the laminating direction relative to the object-shaping material head and the support material head, such that the shaping stage moves to a deeper position in the liquid reservoir in accordance with a progress of the shaping of the shaped object.

4. The shaping apparatus according to claim 1, further comprising:
a shaping stage, on an upper surface of which the shaped object is mounted during the shaping,
wherein a wall that surrounds a periphery of the support layer during the shaping of the shaped object with a clearance from the support layer is formed on the shaping stage by using at least one of the object-shaping material and the support material, and
wherein the shaped object is shaped in at least the part of the period during the shaping of the shaped object while immersing at least the part of the support layer in the predetermined liquid by storing the predetermined liquid between the support layer and the wall.

5. The shaping apparatus according to claim 4, further comprising:
a flowable material head, configured to eject a flowable material, which is a material that maintains flowability during the shaping of the shaped object,
wherein the flowable material head ejects the predetermined liquid as the flowable material, and
wherein the predetermined liquid is stored between the support layer and the wall by ejecting the predetermined liquid from the flowable material head.

6. The shaping apparatus according to claim 1, further comprising:
a flowable material head, configured to eject a flowable material, which is a material that maintains flowability during the shaping of the shaped object,
wherein the shaping apparatus is further configured such that when forming the support layer, a part of the support layer is formed of the support material and at least another part of the support layer is formed of the flowable material,
wherein the support material exists in the support layer in a hardened state, and
wherein the flowable material maintains flowability in the support layer.

7. The shaping apparatus according to claim 6, wherein the support layer in the hardened state dissolves in the flowable material.

8. The shaping apparatus according to claim 1, wherein the shaping apparatus is further configured such that:
when forming the support layer, a part of the support layer is formed of the object-shaping material.

9. The shaping apparatus according to claim 1, wherein an alkalescent aqueous solution is used as the predetermined liquid.

10. The shaping apparatus according to claim 1, further comprising:
an ultrasound generator, configured to generate an ultrasound,
wherein, in at least the part of the period during the shaping of the shaped object, at least the part of the support layer is immersed in the predetermined liquid to which the ultrasound generated by the ultrasound generator is applied.

* * * * *